Nov. 21, 1967 R. LENOBLE 3,353,220
FLEXIBLE MOLD FOR MOLDING A FRAME ONTO A PANE
Filed Jan. 18, 1965 4 Sheets-Sheet 1

INVENTOR.
R. Lenoble
BY
Richards & Geier
ATTORNEYS

INVENTOR.
R. Lenoble
BY
Richards & Geier
ATTORNEYS

Nov. 21, 1967  R. LENOBLE  3,353,220
FLEXIBLE MOLD FOR MOLDING A FRAME ONTO A PANE
Filed Jan. 18, 1965  4 Sheets-Sheet 3
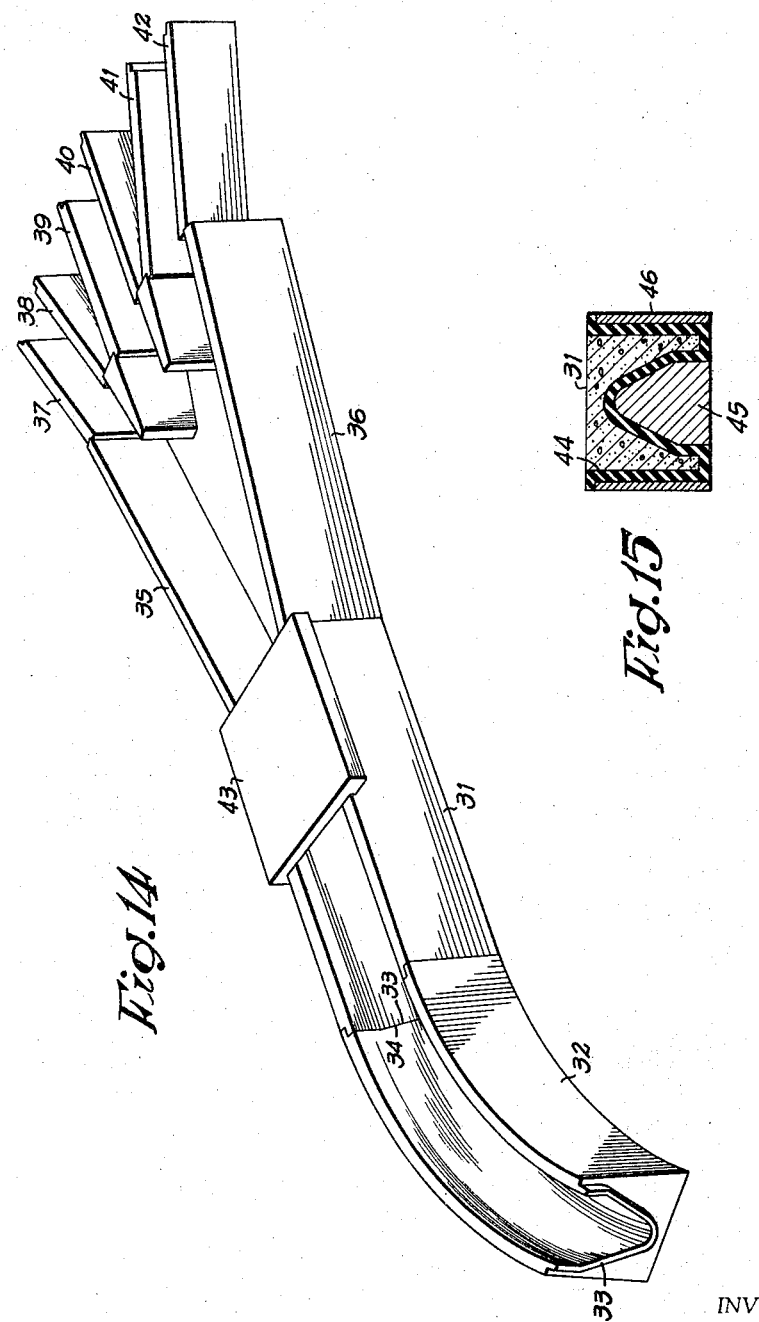
INVENTOR.
R. Lenoble
BY
Richards & Geier
ATTORNEYS Nov. 21, 1967  R. LENOBLE  3,353,220
FLEXIBLE MOLD FOR MOLDING A FRAME ONTO A PANE
Filed Jan. 18, 1965  4 Sheets-Sheet 4

INVENTOR.
R. Lenoble
BY
Richards & Geier
ATTORNEYS

United States Patent Office 3,353,220
Patented Nov. 21, 1967

3,353,220
FLEXIBLE MOLD FOR MOLDING A FRAME
ONTO A PANE
Raymond Lenoble, 1 Rue de Moulin, Gosselies, Belgium
Filed Jan. 18, 1965, Ser. No. 426,328
Claims priority, application Belgium, Jan. 28, 1964,
643,042
2 Claims. (Cl. 18—36)

ABSTRACT OF THE DISCLOSURE

A mold for manufacturing a frame with a pane, a frangible material embedded therein is shown. The mold includes a bottom mold section which is cup-shaped and flexible and is provided with a suction opening therewithin. On the base of this section an upwardly extending rib is disposed which is spaced from the side walls of the frame. A pane of frangible material is adapted to be supported upon the rib. A second mold portion is disposable upon the pane and is laterally and inwardly spaced from the first mold portion. The second mold portion carries a roof thereupon and is also provided with a suction opening. Suction means are adapted to be connected to the respective suction openings so as to provide for a reduced pressure in the compartments formed between the mold portions and the pane.

Description of the invention

This invention relates to the industrial manufacture of any kind of elements in cement conglomerate and more particularly of solid or hollow building blocks, gutter elements, simple or composite covering slabs or stretchers with or without raised or recessed parts for a mutual fitting between adjoining elements.

This invention tends to allow the manufacture of such elements under such conditions that the external surfaces are perfectly smooth and uniform, that the edges are sharp when necessary and that the projecting or recessed parts, even with a small radius or with reduced cross dimensions may be realized correctly without any prejudice to a rapid and systematical moulding or stripping.

For that purpose, a first object of the invention is to provide a process for the manufacture of such elements of cement conglomerate by a preferably unidirectional vibration effect such that the said vibrations are directly transmitted to the conglomerated mass through the intermediary of a relatively flexible or resilient wall, while the adjoining walls which are also of a flexible or resilient material are however rigidly supported by external supports of a resistant material.

In correlation with the said process, another object of the invention relates to a stripping such that the resilient parts in contact with the conglomerated mass are retractable in the extent where, before the stripping, it is necessary to release the projecting or recessed parts cooperating to the formation of the recessed and projecting parts respectively of the so manufactured elements.

In correlation with the same process, still another object of the invention relates more particularly to the manufacture of parts of a certain mass, the stripping in two successive steps, respectively, the separation between the rigid support and the adjoining resilient parts and the proper stripping as just described.

Still another object of the invention relates to special moulds conditioned in such manner that they may present flexible or resilient internal faces such that the said internal faces may be if desired distorted within the elastic limits of the material during the stripping for releasing the fitted portions of the part and the mould from each other, whereas the said internal faces are adjoining to a support having a sufficient resistance to prevent any undue distortion of the said internal faces during the moulding.

The said flexible or resilient internal faces and the said supporting elements thereof may result from a special profiling of the sides of the mould to meet the above conditions. However, these conditions may be also met by using mixed moulds, i.e. a proper mould of a flexible or resilient material with a relatively thin wall, and an external support extending on the whole height or a portion of the height of the said sides of a resistant material, the bottom being in either case realized with a thickness of the said flexible or resilient material, the so conditioned bottom being provided to rest directly on the vibrating table.

The process and the special mould allowing the application thereof are described with further details and without any limitation with reference to the enclosed drawings wherein:

FIGURE 14 is a perspective view of an application of the gutter elements according to FIGURES 12 and 13;

FIGURE 15 is a cross section of the gutter elements according to FIGURES 12 and 13;

Figure 1:
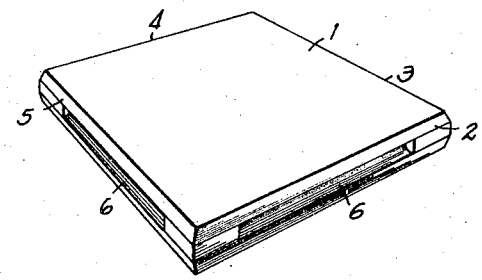
FIGURE 1 is a perspective view of a characteristical covering slab or stretcher obtained by using the process and a mould according to the invention.
Figure 2:
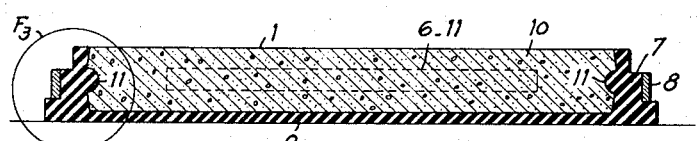
FIGURE 2 is a cross section through a slab according to FIGURE 1, before stripping.
Figures 3, 4:
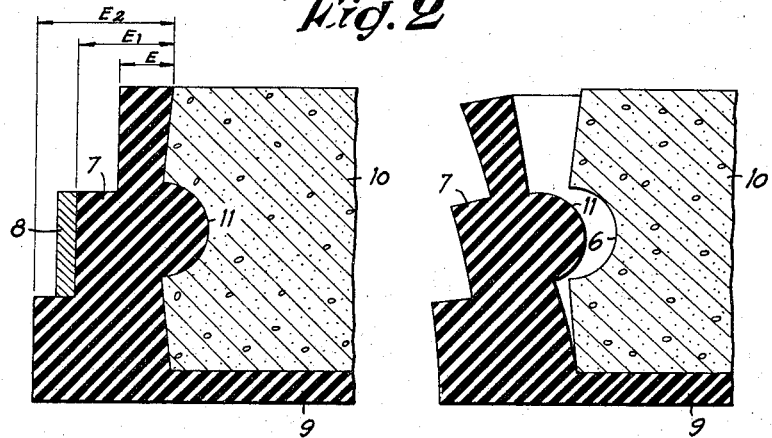
FIGURE 3 is an enlarged view of the portion indicated in $F_3$ in FIGURE 2.
FIGURE 4 is a view similar to FIGURE 3, but during the stripping step.

FIGURES 2, 3 and 4 show the application of the special process and mould according to the invention for the realization of particular stretchers or slabs such as represented in FIGURE 1. This slab 1 is characterized in that it has on each side face 2–3–4–5, a recess 6 promoting the anchorage of the cement joint used for interlocking the adjoining slabs or stretchers in a covering work. The essential advantage of this interlocking is to substantially increase the present surface upon the underlying ground by transmitting the stress of any slab or stretcher to the adjoining slabs or stretchers through the intermediary of bridges provided by the joints engaged through and through in the said recesses 6.

It is important that the latter may be realized without reducing the production rate and without any prejudice to the production of first grade slabs or stretchers, i.e. without impairing the adjoining surfaces or edges.

According to the invention, such conditions are met by applying the previously described process and by working special moulds formed by the cooperation of a proper mould 7 of a flexible or resilient material, e.g. natural or synthetic rubber and, if desired, a rigid external support 8, the essential function of which is to prevent accidental distortions or collapses during the manufacture. The bottom 9 of the mould has a relatively reduced thickness and in any case, since the filled mould is disposed on a vibrating table, preferably with a unidirectional resultant, the vibration effects are transmitted substantially directly to the mass 10, but without any prejudice to the stability of the lateral sides of the mould. These sides have namely a stepped cross section defining three thicknesses E, E1, E2 such that walls of substantially equal resistance are provided. Inwardly and at suitable points, the said lateral sides have a rib 11 or, if desired, recessed portions.

In the embodiment of FIGURES 1 to 4, the purpose of the said ribs 11 is to define, within the side faces of the stretcher or slab 1, the fitting recesses 6 of the intermediate joints between the joining elements.

It will be observed in FIGURES 1 to 4 that the cement conglomerate is only contacting the flexible or resilient material, which allows to provide very fine profiles with a great sharpness. In addition, as diagrammatically represented in FIGURE 4 for separating the moulded article 10 and the proper mould, it is sufficient to slightly distort the lateral faces widely within the elastic limits of the material, thereby releasing without any difficulty the projecting portion from the recessed portions, while allowing a stripping substantially like that for a simple prismatic part.

When the side walls of the mould are constructed solidly with a resilient or a flexible material, these temporary distortions before stripping will occur directly after turning over the mould.

Figure 5:
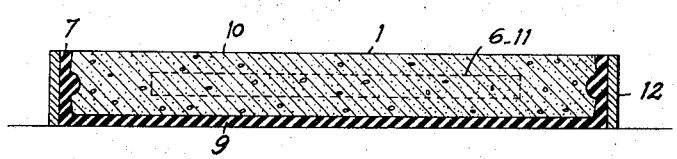
FIGURE 5 is a modification of FIGURE 2.

The embodiment of FIGURE 5 shows diagrammatically a modification, namely to reduce relatively substantially the mass of plastic or resilient material used for the manufacture of the mould.

For that purpose, the proper mould 7 of a resilient material is lined externally with a frame 12 which may extend over the whole height of the mould and the purpose of which is to compensate the relative fragility of the side walls of the mould during the moulding operation; i.e. during the filling of the mould with or without vibrations. In such embodiment and prior to the stripping, it will be sufficient to remove the said frame 12 either manually or even automatically according to the importance of the used industrial equipment.

It will be of course possible to use similar processes or means for the manufacture of any type of conglomerate parts.

FIGURES 6 to 9 show two paving elements and the means for the manufacture thereof.

Figure 6:
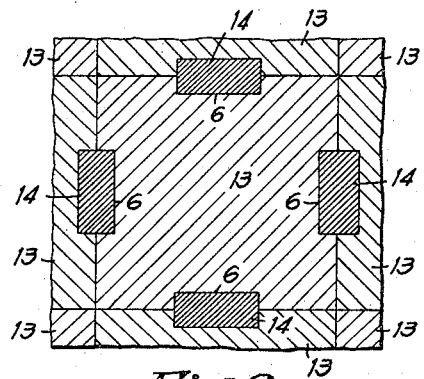
FIGURE 6 is a horizontal section of a portion of a characteristical covering by means of elements obtained by the process and the moulds according to the invention.

The paving block 13 according to FIGURE 6 has the form of a flat prismatic block having semi-cylindrical recesses 6 on its four side faces. When such paving elements 13 are disposed jointly, two recesses 6 are defining a cylindrical space in which is engaged a binding core 14. The said paving elements 13 may be manufactured strictly as described with reference to FIGURES 2 to 5.

Figure 7:
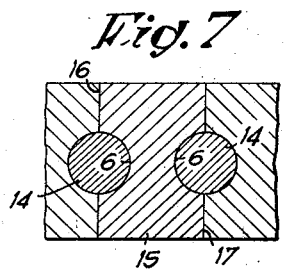
FIGURE 7 is a vertical section of a covering block according to the invention.
Figure 9:
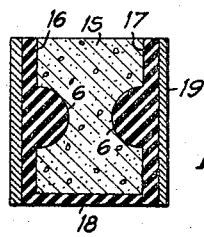
FIGURE 9 is a cross section of a block according to FIGURES 7 and 8.
Figure 8:
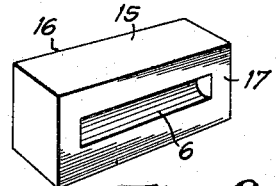
FIGURE 8 is a perspective view of a block according to FIGURE 7.

FIGURES 7, 8 and 9 show a paving block 15, two large opposite side faces of which 16–17 have each a semi-cylindrical recess 6. As diagrammatically represented in FIGURE 9, such blocks may be manufactured by an internal mould 18 of a flexible or resilient material and an external resistant support 19.

Figure 11:
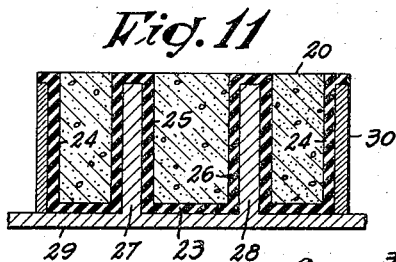
FIGURE 11 is a cross section of a parpen according to FIGURE 10.
Figure 10:
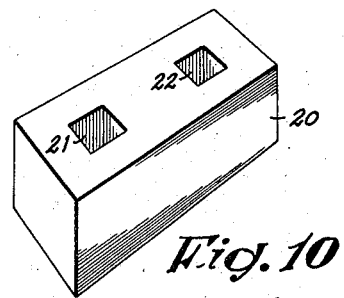
FIGURE 10 is a perspective view of a parpen realized according to the invention.

In another embodiment of the object of the invention, FIGURES 10 and 11 show the manufacture of building blocks 20 of the parpen type, i.e., prismatic blocks of relatively important dimensions traversed through and through by two holes of rectangular section 21–22.

According to the invention, such parpens are manufactured by using moulds comprising substantially a bottom 23, side faces 24 and hollow cores 25–26. In the latter, are engaged resistant supports 27–28 respectively, which are namely integral with the bottom 29. An external frame 30 may rest on the said bottom 29 or it may be even integral therewith. It will be observed that, in spite of the apparent complexity of the section, the conglomerate intended to the formation of the parpens 20 is only contacting the walls of flexible or resilient material.

Under such circumstances too, the interposition between the cement conglomerate and any hard portion of a thickness of a material having a certain elasticity allows to increase the production rate, promotes the stripping and provides such stripping with minimum damages for the stripping parts, which is not the case when using conventional means.

It will be also observed that, although they have a relatively small thickness, the resilient or flexible walls are positively supported substantially everywhere in such manner that they are subjected to minimum stress or strain.

FIGURES 12 to 15 relate to another type of hollow part which may be manufactured very advantageously by the means according to the invention. It is namely a question of gutter elements for laying electrical cables.

This application is interesting as regards the requirements of such gutters, the internal walls of which are to be perfectly smooth to often move slidingly therein cables having sometimes a relatively substantial length.

Thus, it is important to provide very smooth internal faces, which is relatively contrary to the proper characteristics of the cement conglomerate. However, it has already been succeeded to produce perfectly smooth external faces of cast elements of cement conglomerate, namely by using framings of polished steel or synthetic material or yet bakelite wood. However, such means are practically and economically excluded for the industrial manufacture such as these gutter elements.

Figure 12:
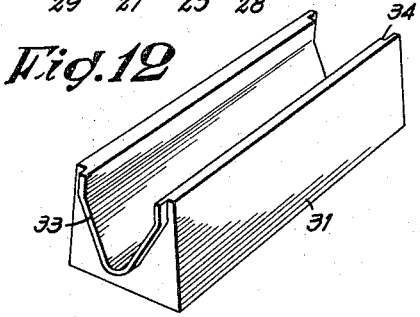
FIGURE 12 is a perspective view of a straight gutter element realized by the special process and moulds according to the invention.
Figure 13:
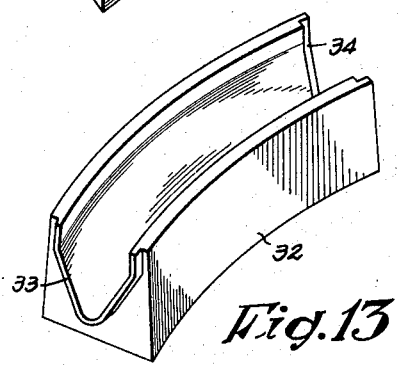
FIGURE 13 is a perspective view of a curved gutter element realized by the special process and moulds according to the invention.

On the contrary, the means according to the invention are very favourable, whether the gutter elements are straight as represented in 31 on FIGURE 12, or curved as represented in 32 on FIGURE 13.

These gutters are of a very critical manufacture both for the essential reason just described and also because the front faces must have a profiled rib 33 on one hand and a profiled shoulder 34 on the other hand in such manner that two such straight or curved gutter elements disposed jointly in extension of each other are fitting by engaging the said rib 33 of the one in the said shoulder 34 of the other.

To show the very importance of such gutter elements, a goose foot is represented in perspective view on FIGURE 14, by juxtaposing a curved element 32, a straight element 33, side panels 35–36 and starting panels 37–38–39–40–41–42 forming the converging fan of the various cables toward the proper gutters. The top of the latter is closed by slabs and covers 43.

FIGURE 15 shows a cross section of a gutter element 31 during the manufacture thereof by the means described therein. These means comprise namely a proper mould 44 of a flexible or resilient material, an inner resistant core 45 supporting the said flexible or resilient material defining the recess of the gutter element and an external frame 46, the function of which has been previously described.

The special process and moulds according to the invention allow the industrial manufacture of relatively very intricate parts under unique conditions of ease and economy.

For instance, there are known the difficulties of an intensive manufacture of concrete frames with at least one incorporated pane. This manufacture with the conventional means is only possible with moulds of polished steel and also with very special care for the introduction of the cement conglomerate, for the packing and principally for the stripping.

Such manufacture with the conventional means is substantially redhibitory. On the contrary, within the scope of this invention and as described hereafter with reference to FIGURES 16 to 20, this manufacture is substantially as simple, rapid and comfortable as the manufacture of simple blocks.

Figure 19:
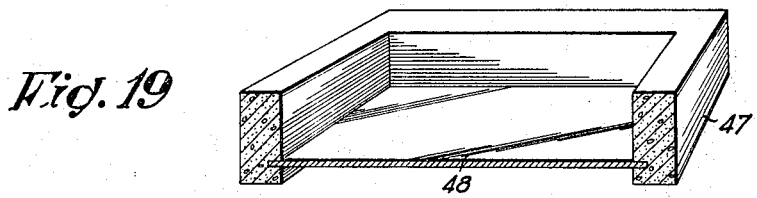
FIGURES 19 and 20 are cross sections with perspective half views of two types of concrete frames with incorporated panes according to the invention.
Figure 20:
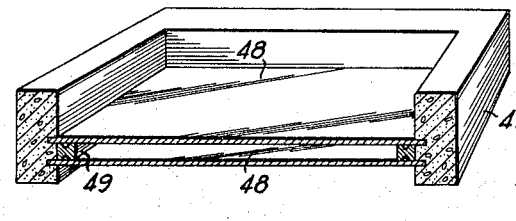

For the manufacture of a simple or double frame, as summarily represented in FIGURES 19 and 20, the same way will be followed.

Such frame comprises substantially the concrete mass 47 forming the proper frame and the embedded pane or panes 48. In the case of a double glazing, inserts 49 may be provided.

Figure 16:
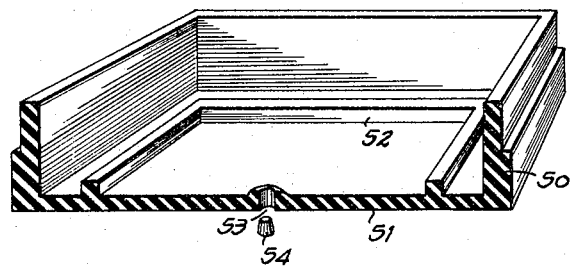
FIGURE 16 is a cross section with a perspective half view of a special composite mould according to the invention for realizing concrete frames with incorporated panes.
Figure 17:
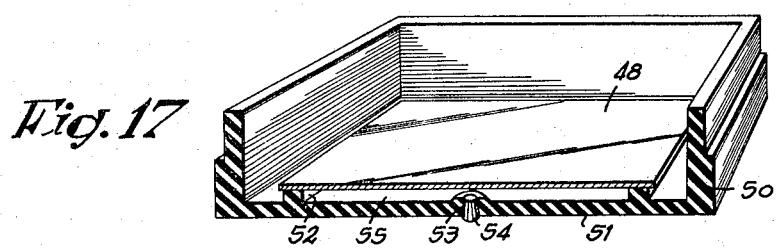
FIGURES 17 and 18 are views similar to FIGURE 16 in two successive steps of the use of the said special mould.
Figure 18:
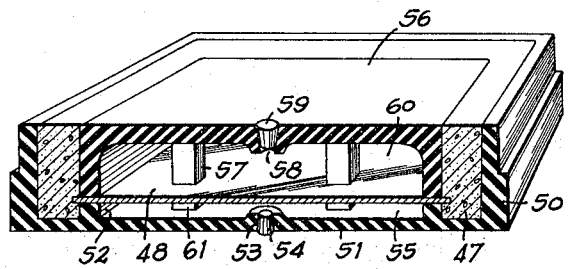

For the manufacture of such intricate parts, there will be started from a mould according to the invention which, as represented in FIGURE 16, comprises side walls 50, a bottom 51 and internal ribs 52. Near its center, the bottom 51 is traversed by an opening 53 which may be sealed by a plug 54. A single pane 48 is laid on the said internal ribs 52 (FIGURE 17). The so defined lower compartment 55 is connected through the opening 53 with a vacuum pump (non represented) to be evacuated, whereupon the plug 54 is set into place, while sealing the opening 53 and the pane 48 is thereby firmly applied upon the underlying ribs 52. Of course, the said simple pane 48 may be replaced by a double pane in which both panes would define with the resilient insert 49 a compartment also evacuated in the known manner.

Then, upon the said pane 48 (FIGURE 18) is disposed a shell or counter-mould 56, the side edges of which are situated in the extension of the said internal ribs 52. The shell lies also upon the pane through intermediate columns 57. This shell has, near its center, an opening 58 which may be also sealed by a plug 59. The latter being temporarily removed, the upper compartment 60 is connected through the opening 58 with a vacuum pump and it is thereby evacuated, whereupon the plug 59 is again set into place. In this position, it will be observed that the panes 48 project beyond the external limits of the core or countermould 56, thereby projecting in the free space outlined externally by the walls 50 of the proper mould and internally by the side walls of the said core. It is then sufficient (FIGURE 18) to cast concrete into the said free space. After setting, the plugs 54–59 are removed and the core 56 and the external mould are released.

If desired, the panes 48 may be supported by additional supports 61, namely when the span of the frames is relatively large.

The different features of the embodiments just described with some details allow readily to understand that the manufacturing means according to the invention may be adapted or applied to the manufacture of any type of solid or hollow articles of cement conglomerate and, preferably, of articles having projecting or recessed portions as well as relatively fine portions.

As generally as possible, whatever the parts being made may be, it is essential that the cement conglomerate contacts only a relatively resilient flexible material and that the latter is either profiled to have a sufficient stability during the different manufacturing or stripping steps, or that it is combined with supporting or resistance elements to support the flexible or resilient material and to prevent the detrimental distortions or collapses during all the manufacturing steps. In either case, the said flexible or resilient material must be such that it may be temporarily distorted within the elastic limits of the material at least during the stripping step, more particularly in view of releasing any projecting or recessed portion from the manufactured part and the adjoining walls of the mould in flexible or resilient material.

The invention relates to the above described process and means as well as to any simple or intricate, small or large part manufactured by the said process and with the said means.

What I claim is:
1. A mold structure adapted to mold a frame with at least one pane of frangible material incorporated therein, said structure comprising,
   (a) a cup-shaped and flexible first mold portion having a bottom member surrounded by integral side walls and provided with a suction opening, said bottom member also having a continuous pane-supporting rib thereupon on its interior surface and spaced from said side walls;
   (b) a cup-shaped and flexible second mold portion adapted to overlie said pane-supporting rib and having a roof portion surrounded by integral side walls provided with a second suction opening;
   (c) suction means operatively connected with said first and second suction openings;
   (d) the dimensions of said first and second mold portions being such as to define a peripheral channel between said first and second mold portions and a compartment between said bottom member of said first mold portion and said roof portion of said second mold portion, said suction means being adapted to apply a reduced pressure within said compartment.
2. A mold structure as defined in claim 1 wherein the dimensions of the side walls of said first mold portion increase from their free edges toward the bottom.

References Cited

UNITED STATES PATENTS

| | | | |
|---|---|---|---|
| 1,539,869 | 6/1925 | Roberts | 264—90 X |
| 1,958,184 | 5/1934 | Cross. | |
| 2,002,510 | 5/1935 | Rosenblatt. | |
| 2,030,524 | 2/1936 | Lambert. | |
| 2,083,484 | 6/1937 | Zampol. | |
| 2,196,258 | 4/1940 | Erdle. | |
| 2,304,984 | 12/1942 | Wood | 264—275 |
| 2,517,902 | 8/1950 | Luebkeman. | |
| 2,714,226 | 8/1955 | Axeirad. | |
| 2,714,746 | 8/1955 | Mejer. | |
| 2,855,653 | 10/1958 | Kastenbein. | |
| 2,918,715 | 12/1959 | Rossi. | |
| 2,958,918 | 11/1960 | MacMillan. | |
| 3,034,191 | 5/1962 | Schafer et al. | |
| 3,061,500 | 10/1962 | Kreier | 264—313 X |
| 3,072,969 | 1/1963 | Du Bois. | |
| 3,086,248 | 4/1963 | Culp. | |
| 3,161,938 | 12/1964 | Graham. | |
| 3,166,795 | 1/1965 | Jaffe | 264—275 X |
| 3,245,130 | 4/1966 | Dowley et al. | |

FOREIGN PATENTS

| | | |
|---|---|---|
| 1,198,460 | 6/1959 | France. |

J. SPENCER OVERHOLSER, *Primary Examiner.*

HOWARD J. FLINT, JR., *Examiner.*